Figure 1:
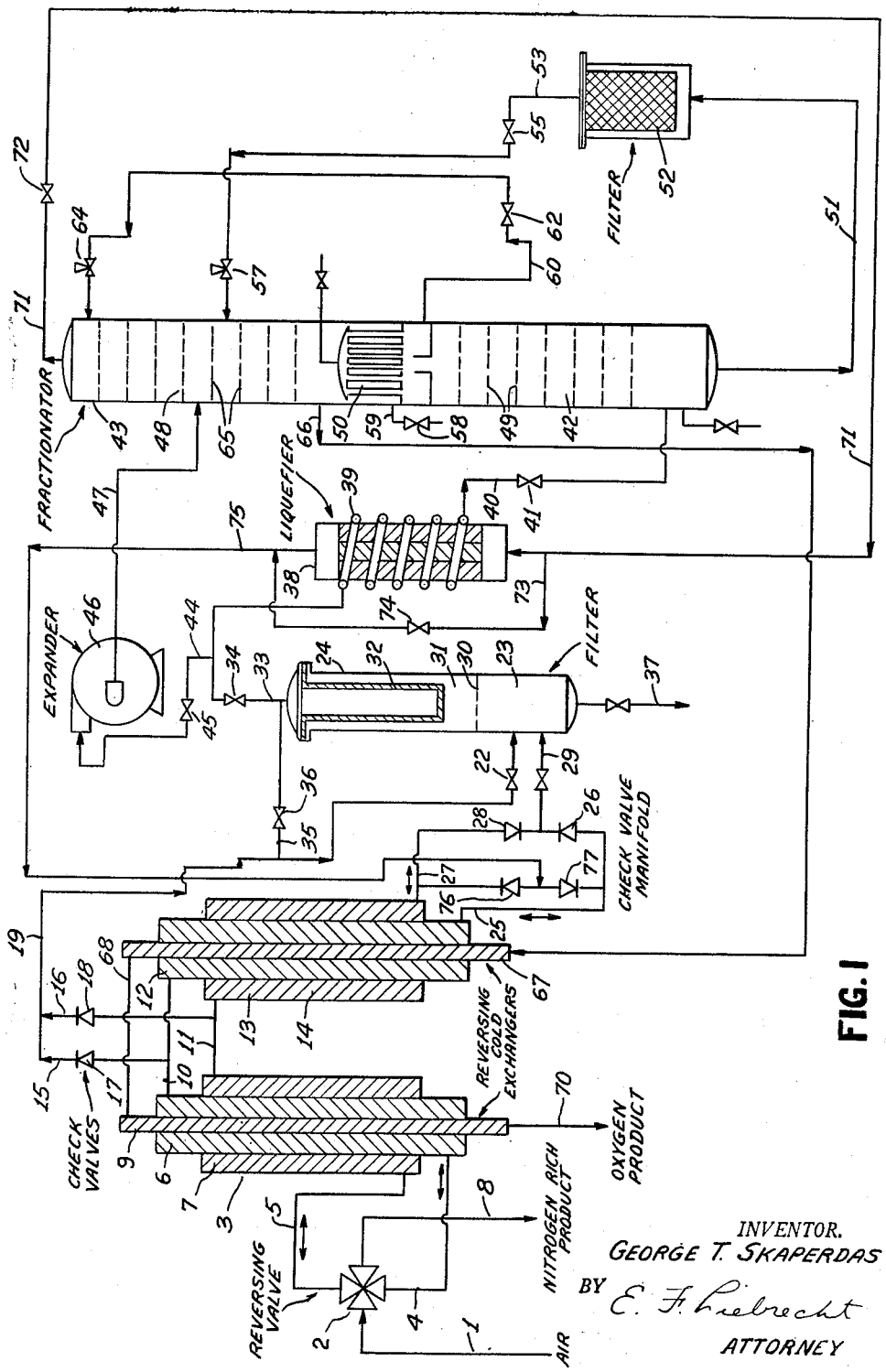

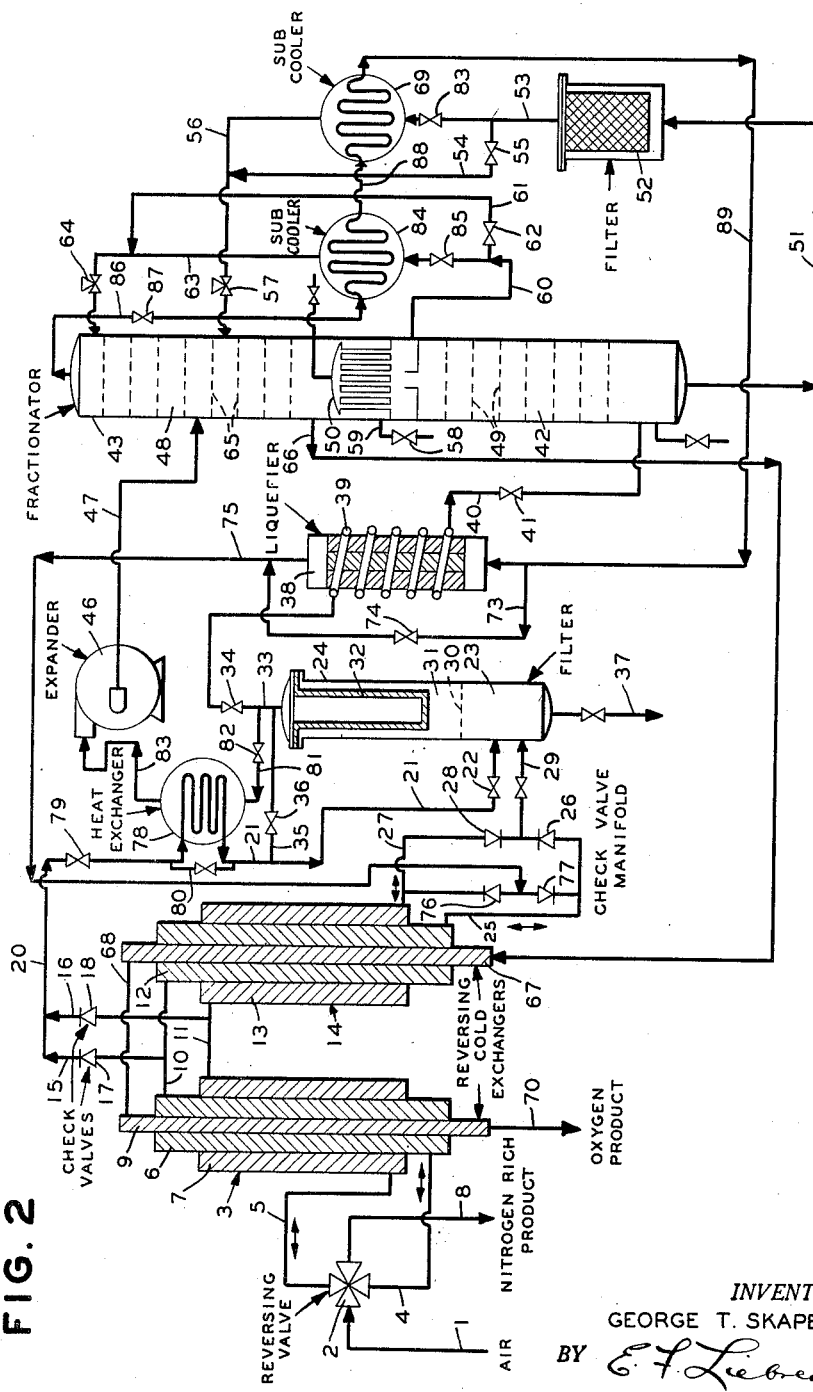

United States Patent Office 2,777,299
Patented Jan. 15, 1957

2,777,299

SEPARATING GAS MIXTURES

George T. Skaperdas, Flushing, N. Y., assignor to The M. W. Kellogg Company, Jersey City, N. J., a corporation of Delaware Continuation of application Serial No. 693,799, August 29, 1946. This application April 13, 1953, Serial No. 348,188

16 Claims. (Cl. 62—123)

This invention relates to an improved method and apparatus for the separation of gas mixtures containing lower and higher boiling components and other components which boil or sublime at still higher temperatures. In a more specific aspect it relates to a continuous method for the separation of air by liquefaction and rectification under moderate super-atmospheric pressure into a substantially pure oxygen-containing fraction and to the elimination of undesirable impurities, such as water, carbon dioxide or other higher boiling components, from the air before the liquefaction and rectification steps.

This application is a continuation of the inventor's copending application Serial No. 693,799, filed August 29, 1946, now abandoned.

The separation of low boiling gas mixtures, for example, air and normally gaseous hydrocarbons, into relatively pure components has been accomplished by processes involving liquefaction and rectification and in such processes it has been customary to elevate the pressure and cool the gas mixture before liquefaction and rectification by counter-current cold exchange with the backward-returning products of the separation under relatively low pressure. This cold exchange causes condensation and/or solidification of higher boiling components present as impurities in the gas mixtures and, to prevent excessive fouling of the cold-exchange zone by accumulation of these components, it has been customary to remove them as effectively as possible. The removal has been effected by a chemical treatment of the gas mixtures before cooling or by passing the gas mixtures through the cold-exchange zone until an appreciable amount of the higher boiling components has accumulated in the apparatus and then removing the fouled apparatus from the process for a thawing out procedure. In one continuous process that does not resort to a segregated thawing out procedure, regenerators, operating in a reversing cycle, have been employed in the cold-exchange zone. To prevent excessive fouling of these regenerators with accumulations of higher boiling components of the gas mixture, the higher boiling components have been evaporated during the reversed phase of the reversing cycle into a greater mass of the returning cold product than the mass of compressed gas mixture from which they were initially obtained. This requires that provision must be made for returning enough of the cold product during the reversed phase of the cycle to compensate for the difference in temperatures and pressures of the flowing streams. One expedient for supplying an excess of the returning product has been to purify a separate part of the gas mixture by chemical treatment, thereafter to compress the purified gas to a relatively high pressure and then expand it into the system at a point subsequent to the cooling of the main gas stream. The expansion from the higher pressure supplies additional cold and, while the method does prevent excessive fouling in the cooling step for extended periods of time, the expedient requires a combination of steps for purifying and cooling the total gas mixture and for this reason is not the most economical procedure.

It is an object of the present invention to modify the flow of gases in a reversing heat exchange zone combined with a mixing zone and a separating zone so as to provide for complete removal of higher boiling components from the feed gas mixture without having recourse to chemical purification.

The present invention is equally applicable to cold exchange steps comprising either reversing cold regenerating or reversing cold-exchange zones of the non-regenerative type. In the following further description the invention is described by reference to a continuous process for the separation of air under moderate super-atmospheric pressure wherein the cooling step utilizes a countercurrent, reversing, cold-exchange zone of the non-regenerative type. It is to be understood, however, that this description presents a specific embodiment of the invention for the purpose of illustration and that the invention is capable of other embodiments and is equally applicable to the separation of other gas mixtures, such as low molecular weight hydrocarbons.

A cold exchange zone of the non-regenerative type as herein described for the separation of air accomplishes cold exchange by counter-currently passing air and a backward-returning product of the separation, such as the nitrogen-rich product, alternately through at least two duplicate passageways in the apparatus. These passageways preferably are packed with a metallic packing material of high thermal conductivity so installed as to expose an abnormally great surface area of metal to the streams of flowing gases. Wherever the metal packing touches the walls of the passageways a metal to metal bond is established to effect a highly efficient path of thermal flow between the metal packing and the walls of the passageways. As a result of the great surface area of metal there is a rapid pick up and dissipation of heat from and to the gas streams which, combined with the efficient path of thermal flow between the passageways, ensures that heat removed from one flowing gas stream is very effectively transferred to the opposite flowing stream. Consequently, when the counter-currently flowing streams of air and cold product are periodically switched, i. e., alternated or reversed with each other, the temperatures of the gases at all points throughout each passageway quickly assume the conditions existing in the opposite passageway at the moment of switching with no substantial temperature lag in the heat exchange relation between the two streams by reason of interchanging their channels of flow. In other words, substantially no regenerative effect is obtained in the system because of the switching. Other products of separation similarly may be passed through other passageways of the aforementioned cold-exchange zone and thereby augment the cold being imparted to the incoming air. These products, however, are not necessarily passed through reversing passageways and pure products preferably are not so passed.

During the operation of the cold-exchange zone each of the reversing passageways alternately carries air, laden with higher boiling components as impurities, such as water and carbon dioxide, for half of the reversing cycle, the amount being a function of the pressure and temperature of the air. Because these components have relatively high boiling points in comparison with air, they are condensed as liquid or precipitated as a solid on the surfaces of the metal packing and on the walls of the passageway while the air is being progressively cooled. That part of the cold-exchange zone wherein such condensation or precipitation occurs may be designated as a "colder portion" of the zone for the purpose of definition in this specification. Subsequently, when the passageways are alternated, that is, during the reversed half of the cycle, and when the effluent cold product has replaced the air in a passageway, these components are evaporated into the product stream and thereby are removed from the system.

Complete evaporation of these components, however, does not occur unless conditions influencing complete evaporation are effectively maintained at the points in the cold-exchange zone where depositions of such components take place. It is well known that a decrease in pressure results in a gas having greater ability to carry vapors of a higher boiling, or condensable, component. Likewise, it is also well known that a decrease in temperature causes a decrease in the amount of such condensable component that can be so held in the vapor state. For example, consider a point in the cold-exchange zone where deposition of a higher boiling component of the air, such as carbon dioxide has occurred. The fact that the effluent product passing over that point is at a lower pressure than the compressed air makes it possible for the product to evaporate and carry away more of the carbon dioxide than the air can deposit at that point. But, as the result of the lower temperature of the effluent, it is unable to evaporate and carry away as much carbon dioxide as the compressed air deposits. Thus, it can be seen that two opposing influences determine the evaporating efficiency of a reversing cold-exchange zone. That is, the pressure differential between the compressed air and the effluent product aids evaporation but the temperature difference hinders evaporation. Since the pressure differential is fixed by the refrigeration and the distillation requirements of the system, it becomes evident that there must be a certain critical temperature differential for any given pressure differential which can not be exceeded if complete evaporation of the carbon dioxide is to be obtained. By reason of the vapor pressure relationships involved in a system of this character this critical temperature differential varies to a small extent from one end of the cold-exchange zone to the other as the temperature level therein varies. The critical temperature differential also may be defined as being the maximum allowable temperature difference.

In a reversing cold-exchange zone, wherein the compressed inflowing air is cooled by cold exchange relation with an equal mass of effluent products, the temperature difference between the compressed air and effluent scavenging stream with which the air is reversed normally increases from the warm end towards the cold end of the cold-exchange zone. In such a cold exchange relation while the existing temperature difference is sufficiently below the critical temperature difference for the evaporation of the deposits at the warm end of the exchanger, the aforementioned increase causes the temperature difference to exceed the critical temperature difference for the deposited material at the cold end of the cold-exchange zone, thereby making complete evaporation at the cold end impossible. This temperature difference increases towards the cold end of a cold-exchange zone in which the mass of the compressed air is equal to the mass of the effluent stream because the specific heat of the warm air stream is higher than the specific heat of the cold effluent stream as a result of the higher pressure of the former. The effect of a higher specific heat can be overcome by decreasing the mass of compressed air relative to the mass of effluent products in cold exchange with the air. When the mass of compressed air is reduced sufficiently, the tendency of the higher specific heat of the air to cause an increase in the temperature difference towards the cold end of the cold-exchange zone is overcome and indeed reversed so that the temperature difference decreases towards the cold end of the zone. By this means, it then becomes possible to decrease the temperature difference sufficiently in the colder portions of the cold-exchange zone so that this difference is smaller than the critical temperature difference. When this is accomplished, the deposited materials can be completely evaporated during the reversing cycles and the cold-exchange zone made completely operable for long periods of time.

One embodiment of this invention is concerned with the decrease of the temperature difference in the colder portions of the cold-exchange zone to values within the maximum allowable, or critical, temperature difference for carbon dioxide evaporation. This is accomplished by diverting a minor portion of the air around the colder part of the cold-exchange zone and, in doing this, to further reduce the temperature of the compressed air in the colder portions substantially below that temperature which would be obtained normally in the absence of any such diversion. This further reduction of the temperature of the undiverted air precipitates enough carbon dioxide in the colder portion so that the cold air as it subsequently leaves the cold-exchange zone is substantially devoid of this material. The two separated streams are thereafter commingled and the low temperature of the undiverted portion reduces the temperature of the diverted portion sufficiently so that the carbon dioxide constituent of the latter portion substantially completely precipitates and is readily extracted therefrom by filtration or other means of removal. Pursuant to this method the carbon dioxide content of the main portion of air is deposited in the reversing cold-exchange zone and it is only a relatively small amount of this material which is discarded in the removal step.

The accompanying drawing is an exemplary process flow arrangement depicting a low pressure air separation process which embodies the present invention. Referring to the drawing, atmospheric air, which has been treated previously to remove dust, water, or other impurities, and pressured to about 85 pounds per square inch gauge, is introduced into the process through line 1 at a temperature of about 100° F. Line 1 connects with reversing valve 2 which has settings to permit passage of the air into reversing exchanger 3 by way of either line 4 or line 5. Exchanger 3 is shown herein, for convenience, as being constructed of a number of concentric annular passageways surrounding the central tubular passageway. This particular arrangement of the exchanger is not essential as other arrangements are just as applicable for the cold exchange step. It is preferable, however, that these passageways, especially the ones employed for reversing, be filled with a metallic packing such as a coil of edge-wound metallic ribbon, pins, etc., adfixed to the walls thereof with a metal to metal bonding material, for example silver solder, so as to provide an extremely efficient path of thermal flow between the fluid streams passing through the exchanger. Valve 2 preferably is operated automatically so that the valve settings will cause the compressed air to flow part of the time through line 4 and upwardly through passageway 6 of the exchanger. During the interval while the compressed air is passing through passageway 6, cold backward-returning nitrogen-rich product is passing downwardly through passageway 7 in countercurrent cold-exchange relationship with the air in passageway 6. The nitrogen-rich product thereupon leaves exchanger 3 through line 5, reversing valve 2 and is exhausted into the atmosphere through line 8. After an interval of time the setting of valve 2 is reversed and the compressed air caused to flow through passageway 7. At this time the nitrogen-rich product flows downwardly through passageway 6 and is vented to the atmosphere through line 4, valve 2 and line 8. In addition to the cooling effect obtained from the nitrogen-rich product, the compressed air receives additional cooling effect from the backward-returning oxygen product stream that is passing continuously through the inner passageway 9 of exchanger 3, the direction of flow of the latter stream necessarily being always countercurrent to the flow of the compressed air.

The temperature of the air during its passage through exchanger 3 is reduced progressively to about minus 150 to minus 162° F. and this causes the residual amounts of water vapor which entered the exchanger with the compressed air to be precipitated as liquid and/or frost upon the metal surfaces of its passageway. Substantially anhydrous air leaves exchanger 3 either through line 10 or line 11, depending upon the phase of the reversing cycle, and is conducted therethrough into either passageway 12 or 13 of reversing exchanger 14. This latter exchanger is constructed similarly to exchanger 3 and its several passageways likewise function similarly to the corresponding passageways of exchanger 3. Exchanger 14 does not necessarily need to be a separate vessel and optionally may be a continuation of exchanger 3 having its passageways as extensions of the corresponding passageways of exchanger 3.

During its passage through exchanger 14 the temperature of the compressed air is lowered further to a degree below that at which carbon dioxide precipitates but which is above the dew-point of the air. Pursuant to present embodiment of the invention, approximately 10% of the compressed air is diverted from the main stream passing through the exchangers and is taken away by line 15 or 16, having check valves 17 and 18 respectively, depending upon whether the flow of the compressed air is through line 10 or 11 in accordance with the phase of the reversing cycle. The diverted portion of the air is then passed through line 19, having valve 22, into the lower section 23 of filter vessel 24. Meanwhile, the remaining 90% portion of the compressed air continues through exchanger 14 in cold-exchange relation with the nitrogen-rich product and thereby has its temperature reduced to about minus 268° F. At this temperature the compressed air leaves the exchanger by way of either line 25 and check valve 26 or line 27 and check valve 28, again depending upon the particular phase of the reversing cycle. In either event the compressed air finally is passed through valved line 29 and is introduced therethrough also into lower section 23 of filter vessel 24. This section serves as a mixing zone and the diverted and undiverted portions of the compressed air are thoroughly commingled with a resultant temperature reduction of the diverted portion to a degree which is below the solidification temperature of its carbon dioxide content. Consequently, carbon dioxide is precipitated therefrom and carried as a suspension of solids in the total compressed air stream. While some of the solid particles settle by gravity to the bottom of the mixing zone, the majority of the particles are conveyed with the air through perforated baffle 30, whose function is to provide complete mixing of the two streams before the filtering step, into the filter section 31 of vessel 24. A hollow cylindrical filter element 32, comprising as the filter means glass cloth, porous stone, Porex, etc., projects into section 31. The compressed air, leaving the solid particles of carbon dioxide on the walls of the filter element passes into the central space behind the walls and thereafter leaves vessel 24 by way of line 33, having valve 34, substantially completely free of carbon dioxide. Two or more filtering vessels similar to vessel 24 may be employed for the filtering step so as to permit alternate switching of the vessels off the line for cleaning. If desired, the solid particles of carbon dioxide may be removed from the compressed air by means of cyclone separators. An auxiliary by-pass or blow-back line 35, having valve 36 is interposed between lines 19 and 33 and may be used for passing compressed air in reversed direction through a fouled filter to clean it. In this event, the air used for cleaning the filter may be vented through the valved vent line 37.

The purified and cooled compressed air leaves vessel 24 through line 33 at a temperature of about minus 253° F. and once more is divided into two portions. The larger portion, which in the present instance represents approximately 59% of the air stream, continues to pass through line 33 to liquefier vessel 38 for cold-exchange relation with the nitrogen-rich product. The air, being under a superatomspheric pressure, preferably is conducted through coil 39 around the liquefier while the nitrogen-rich product, since it is under a lower pressure, is passed through the shell of the liquefier. To provide for efficient thermal flow liquefier 38 may also be packed with a metallic packing and this packing bonded to the inner walls of the vessel, or otherwise constructed. Likewise coil 39 is metal bonded to the exterior wall of vessel 38 and for the same reason. The cold-exchange relation obtained in vessel 38 causes a further reduction in the temperature of the air to about minus 274° F. and this low temperature effects partial condensation of the compresssed air to an extent of about 10%. The thus partially condensed air leaves the liquefier through line 40 and the interposed valve 41 and is conducted therethrough into the bottom of the high pressure section 42 of fractionator 43.

Returning now to the portion of compressed air which is diverted from line 33, this portion which amounts to 41% of the total air passing through line 33 is taken through line 44 and control valve 45 and injected into expander engine 46. In the expander the pressure of this portion of the compressed air is reduced with the performance of work to about 10 pounds per square inch gauge and its temperature correspondingly is lowered to approximately minus 304° F. In this expanded condition the diverted portion of the air is taken from the expander through line 47 and introduced as vapor feed into the low pressure section 48 of fractionator 43. A knock-out drum may be placed in line 47, if desired, to facilitate the starting-up operation and to remove any residual impurities in the expanded air.

Returning now to a consideration of what occurs in the high pressure section 42 of the fractionator, the vaporous part of the compressed air from line 40 rises upwardly through the several vapor-liquid contact trays 49 and thus is brought into contact with a liquid reflux formed by condensation in the top of this section. This contact effects a bottoms product rich in oxygen and a top product which is practically pure varporous nitrogen. Vapors of nitrogen rise upwardly into the condensing tubes of calandria 50 which, being immersed in a body of boiling liquid oxygen at minus 288° F. serves as the reboiler for the low pressure section 48 by obtaining the necessary heat for reboiling from condensation of the nitrogen vapors. Liquefied nitrogen at minus 282° F. returns from the calandria into the top of high pressure section 42 where a part is collected on an upper tray and the remainder is caused to cascade downwardly over trays 49 as the reflux liquid. In descending over trays 49 the liquid nitrogen absorbs heat to condense the rising vapors of air and the greater portion thereof is revaporized. The oxygen-rich liquefied air resulting from the fractionation accumulates in the base of section 42 at a temperature of about minus 272° F.

A portion of this liquid is withdrawn continuously through line 51, passed through filter 52 and line 53, having valve 55, to an expansion valve whereupon it is expanded through expansion valve 57 into an intermediate part of the low pressure section 48 of fractionator 43. It is the function of filter 52 to remove any residual particle of solid carbon dioxide which may have advanced thus far in the system. Duplicate vessels similar to filter 52 may be employed to permit removal of a fouled filter element for cleaning.

Simultaneously with the introduction of the oxygen enriched liquefied air to the low pressure section 48, liquefied nitrogen likewise is withdrawn from the high pressure section and caused to flow through line 60, having valve 62, to the low pressure section whereupon it is introduced into the top of section 48 through expansion valve 64. As stated heretofore, vaporous air under low pressure is introduced into section 48 of the fractionator from line 47. These vapors are contacted at this low pressure with the liquefied constituents expanded into this section of the fractionator through expansion valves 57 and 64. Rectification occurs on the several vapor-liquid contact trays 65 of this section whereby a nitrogen-rich vaporous product is taken overhead from this section and a substantially pure oxygen product is accumulated as a liquid bottoms product surrounding calandria 50. Revaporization of liquefied oxygen, as the result of condensing nitrogen vapors in the calandria, provides for the vapor reflux in section 48. At times it may be necessary to reject from the system a small part of the liquefied oxygen accumulated in the base of the low pressure section 48. This is done by opening valve 58 in the drain line 59. A portion of the oxygen vapors are removed from section 48 at a point immediately above the level of the liquefied oxygen surrounding calandria 50 and passed through line 66 to the innermost passageway 67 of cold exchanger 14. The oxygen vapors are subsequently warmed to approximately 91° F. by passage through exchanger 14, line 68 and passageway 9 of exchanger 3. The warmed oxygen is then removed as a pure product of the process through line 70.

Simultaneously with the removal of oxygen vapors from the fractionator, nitrogen vapors are taken overhead through line 71 at a temperature of about minus 311° F. and at a pressure of about 10 pounds per square inch gauge. In the present example these vapors flow through line 71, having valve 72 to liquefier 38 for countercurrent cold-exchange relation with the portion of compressed air as heretofore described. In the event that all of these vapors are not required to provide for the cold exchange necessary to reduce the temperature of the compressed air flow through line 40 to about minus 274° F., a portion of the nitrogen vapors may be by-passed around liquefier 40 through line 73, having valve 74, and rejoin the nitrogen vapors leaving the liquefier through line 75. The now combined total nitrogen-rich product stream, which has been warmed by the heat exchange with warmer air to a temperature of about minus 275° F., is conveyed through line 75 to the check valve manifold system controlling the fluid flow into the cold end of exchanger 14. During the interval when valve 2 has been operated to cause the compressed air to flow through passageways 6 and 12 of exchangers 3 and 14 respectively and to leave the latter exchanger by way of line 25 and check valve 26, the mechanism of the check valves cause the backward-returning nitrogen-rich product to flow through check valve 76 into line 27 and through passageways 13 and 7 of exchangers 14 and 3 respectively. After its passage through the exchangers the nitrogen product is vented from the system through line 5, reversing valve 2 and line 8 at a temperature of about 91° F. During the reversed phase of the operation of the exchangers when valve 2 is actuated to cause the compressed air to flow through passageways 7 and 13 and to leave the latter passageway through line 27 and check valve 28, the mechanism of the check valves will automatically actuate themselves to permit the nitrogen-rich product to flow from line 75 through check valve 77 into line 25 for passage through passageways 12 and 6 of exchangers 14 and 3 respectively. In this event, the nitrogen-rich product is vented to the atmosphere from the latter passageway through line 4, reversing valve 2 and line 8.

In the event that the expander efficiency is high enough to require an inlet temperature so warm that the compressed air is not properly purified in the reversing cold-exchange zone under the conditions prevailing to obtain the required expander inlet temperature, the foregoing process arrangement is modified. Pursuant to this modification, diagrammatically shown in Fig. 2 proper purification of the compressed air is obtained by utilizing the reversing cold-exchange zone to cool the air below the required expander inlet temperature to a satisfactorily reduced temperature for purification and thereafter by heat interchange heating the expander feed against the diverted portion of the compressed air to a temperature that will prevent the formation of liquid air in the expander engine.

Referring to the drawing of Figure 2, and particularly to the compressed air flowing through lines 10 or 11 according to the phase of the reversing cycle, in the present modification approximately 6% of the air compressed to about 85 pounds per square inch is diverted from the main stream through lines 15 and 16. The thus diverted portion is then carried through line 20 to cold exchanger 78, valve 79 being suitably adjusted for proper flow conditions. Cold exchanger 78 is utilized for the purpose of extracting heat from this portion of the compressed air with no precipitation of carbon dioxide as shall be explained hereafter. From exchanger 78 this portion of the air passes through line 21 at a somewhat lower temperature and is introduced therethrough into the lower section 23 of filter vessel 24. The remaining 94% portion of the compressed air continues its passage through either line 10 or 11 and exchanger 14 whereby its temperature is reduced to about minus 266° F. with resultant carbon dioxide precipitation. This portion likewise is introduced into section 23 of the filter vessel to be thoroughly commingled therein with the smaller aforementioned diverted portion. The temperature of the recombined streams of air reaches approximately minus 261° F. and at this temperature the remaining carbon dioxide is precipitated and carried as a suspension of solids in the air into filter section 31 of vessel 24. Filtered air, substantially free of carbon dioxide, leaves vessel 24 through line 33 but since it is at a temperature in the neighborhood of minus 261° F. the air at this temperature cannot be expanded in the expander engine without being at least partially condensed to the liquid phase. Therefore, for the purpose of raising the temperature to a degree sufficiently high to prevent the occurrence of condensation, this air is passed through cold exchanger 78 by way of line 81, valve 82 being opened. It is thus brought into heat-exchange relation with at least part of the diverted 6% portion of the compressed air which passes into and out of exchanger 78 by way of lines 20 and 21 respectively whereupon the air leaving heat exchanger 78 through line 83 is warmed to about minus 235° F. Valved line 80 serves as a by-pass line for temperature control purposes in exchanger 78. At this temperature the thus warmed air is passed to expander 46 from the exchanger by way of line 83. When the air is subsequently expanded with the performance of work in expander 46 to a reduced pressure of about 10 pounds per square inch gauge no condensation of liquid air occurs so that dry expanded air passes through line 47 at a temperature of about minus 304° F. for introduction into the low pressure section 48 of fractionator 43 as the vapor feed thereto.

That part of the filtered compressed air not diverted from line 33 to the expander is taken to the liquefier 38 at the aforementioned temperature of minus 261° F. In this vessel it is placed in cold-exchange relation with the cold nitrogen-containing product for a further reduction in its temperature to the order of about minus 274° F. This may effect a partial condensation to liquid before this portion of the air is introduced into the high pressure section 42 of the fractionator by way of line 40. As explained heretofore rectification takes place in the section of the fractionator to produce an oxygen-rich liquid bottoms product and a substantially pure liquefied nitrogen top product.

The liquefied oxygen-rich product, which has collected in the base of the high pressure section 42 of the fractionator, is withdrawn in a continuous stream through line 51, passed through filter 52, and introduced into subcooler 69 by way of line 53, valve 83 being opened. In subcooler 69 this stream is further cooled by cold exchange with the product nitrogen vapors to such an extent that when it is thereafter expanded into the fractionator through valve 57 in line 56 there is no excessive vaporization of this liquid. Simultaneously with the passage of the oxygen-rich liquid through the subcooler, the liquefied nitrogen top product from section 42 is removed from an upper tray of section 42 and passed through line 60 to subcooler 84, valve 85 being opened. The stream of this product likewise is subcooled in subcooler 84 by the cold vapors of nitrogen effluent from the top of fractionator 43 to prevent excessive flashing of this material as it also is expanded into the top of section 48 through expansion valve 64 after passage through line 63. Rectification of the vaporous air from expander 46 and the components expanded through valves 57 and 64 takes place at the reduced pressure existing in section 48. The liquid bottoms product of this rectification, being substantially pure oxygen, accumulates as a pool of liquid surrounding the tubes of calandria 50. Vaporization of the liquefied oxygen occurs as the result of condensing nitrogen vapors within the tubes of this calandria and supplies the vapor reflux for section 48. A portion of the thus formed oxygen vapors are removed from the fractionator at a point immediately above the level of the pool of liquefied oxygen and taken from the system in the manner stated heretofore. The vaporous nitrogen overhead product of the rectification is taken from fractionator 43 at a temperature of about minus 311° F. through line 86, valve 87 being opened, to subcooler 84. Having been warmed somewhat in subcooler 84 by subcooling the liquefied pure nitrogen, these vapors of nitrogen pass immediately to subcooler 69 by way of line 88 wherein they again impart some of their cold to effect subcooling of the oxygen-rich liquid passing through the shell side of this subcooler. The thus further warmed stream of nitrogen vapors leave subcooler 69 through line 89, to liquefier 38.

The foregoing illustrative examples describe processing arrangements wherein the oxygen-rich product is recovered in the vapor phase. It is to be understood, however, that this product optionally may be recovered in the liquid phase and in this event the aforedescribed operating conditions necessarily will have to be readjusted to meet the change of refrigeration requirements imposed on the system.

It is to be understood further that my invention is not to be limited to any of the embodiments described herein for illustrative purposes but only in and by the following claims.

I claim:

1. An apparatus for separating a gas mixture into output components including in combination a cold-exchanger consisting of at least two fluid conduits connected in operative cold exchange relation to effect cooling of a compressed gas mixture by countercurrent cold exchange with at least one of the cold expanded output components of the separation, means for conducting a compressed gas mixture to either of said fluid conduits, means for separating and removing a portion of the compressed gas mixture from said cold-exchanger at a point intermediate the ends thereof, a fluid mixing chamber, a fluid conduit connecting between said means for separating and removing a portion of the compressed gas mixture and said mixing chamber, another fluid conduit for conducting the remainder of said gas mixture from the cold end of said cold-exchanger to said mixing chamber, means for removing solid precipitated vapors from said gas mixture, a fluid transfer means connecting in operative relation said mixing chamber and said solids removal means, a gas expanding means, a fluid conduit connecting said gas expanding means and said solids removal means, a heat exchanger disposed in said last-mentioned fluid conduit and connected in operative relation with said fluid conduit connecting between said means for separating and removing a portion of the compressed gas mixture from said cold-exchanger and said mixing chamber for warming gas passing through the former conduit by heat exchange with gas passing through the latter conduit, means for liquefying and rectifying a gas mixture into higher and lower boiling output components, conduits connecting in operative relation said last-mentioned means with said gas expanding means and said solids removal means for passing gases therethrough from the latter to the former means, conduits having their origin in said means for liquefying and rectifying a gas mixture at least one of which connecting with said cold-exchanger for passing out of the output components of the separation therethrough in its vapor phase, means for passing said one of the output components to either of said two fluid conduits connected in operative cold exchange relation in said cold-exchanger, valve means for controlling flow of said compressed gas mixture and said one of the output components through the fluid conduits in said cold-exchanger and means for periodically so changing the valve means as to interchange the flow of the compressed gas mixture and said one of the output components between said fluid conduits in said cold exchanger.

2. An apparatus for separating a gas mixture into output components including in combination a cold exchanger consisting of fluid conduits connected in operative cold exchange relation to effect cooling of a compressed gas mixture by countercurrent cold exchange with at least one of the cold expanded output components of the separation, conduit means connecting a source of the compressed gas mixture and at least two of said fluid conduits, valve means in the last-mentioned conduit means for alternately directing a compressed gas mixture to one of said fluid conduits while simultaneously excluding flow of compressed gas mixture to the other, means for separating and removing a portion of the compressed gas mixture from said cold exchanger at a point intermediate the ends thereof, a fluid mixing chamber, a fluid conduit connecting between said means for separating and removing a portion of the compressed gas mixture and said chamber, another fluid conduit for conducting the remainder of said gas mixture from the cold end of said cold exchanger to said chamber, a means for removing solid precipitated vapors from said gas mixture, a fluid transfer means connecting in operative relation said chamber and said solids removal means to transfer solids-containing gas mixture from the chamber to the solids removal means, a means for liquefying and rectifying a gas mixture into higher and lower boiling components, a fluid conducting means connecting said solids removal means and said liquefying and rectifying means for conducting outflowing solids-free gas mixture from the said removal means to the rectifying means, a gas expanding means, a fluid conduit connecting between the compressed gas inlet of said gas expanding means and the said fluid conducting means for passing a portion of the solids-free gas mixture being conducted through said fluid conducting means to the gas expanding means, a fluid conduit connecting the gas outlet of said gas expanding means and said liquefying and rectifying means for conveying expanded gas mixture therethrough from the formed to the latter means, tubular conduits having their origin in said means for liquefying and rectifying, one of which connecting operatively with the cold end of each of said first-mentioned two fluid conduits in said cold exchanger, for passing output components of said gas mixture from said liquefying and rectifying means therethrough, valve means in said one of the tubular conduits connecting with said first-mentioned two fluid conduits for alternately passing one of the output components to one of said two fluid conduits while simultaneously excluding delivery of said output component to the other, means for actuating both said mentioned valve means cooperatively thereby simultaneously directing flow of said compressed gas mixture and said one of the output components through one of said two fluid conduits in said cold exchanger and periodically changing the valve means as to interchange the flow of the compressed gas mixture and said one of the output components alternately between said two fluid conduits in said cold exchanger.

3. In the method for separating a mixture of gases having different boiling points in the liquid state, comprising passing such a gas mixture in a compressed condition through a path in a heat exchange zone wherein the gas mixture is cooled, passing an output component of said separation under low temperature and pressure than said compressed gas mixture through another path in said zone in countercurrent heat exchange relation with said gas mixture and periodically interchanging the flow of the gas mixture and said output component in said paths, each of the gas mixture and output component passing through the zone always in the same direction as the initial flow thereof irrespective through which of said paths it is flowing so that, by reason of the countercurrent relationship between the gas mixture and output component, each said interchange reverses the direction of fluid flow in each of said paths; the improvement which comprises separating said gas mixture into two parts prior to its complete passage through said zone, removing the first of said parts directly from said zone, continuing the passage of the second part through said zone, further cooling the gas mixture in said second part to a temperature sufficient to substantially completely precipitate and deposit a higher boiling constituent of the gas mixture in a colder portion of said zone, removing the further cooled said second part from the heat exchange zone, commingling both of said parts of the gas mixture, whereby the first part is cooled sufficiently by said further cooled second part to at least said precipitation temperature to precipitate substantially completely therefrom the said higher boiling constituent, removing the precipitate from the commingled parts of said gas mixture, separating the gas mixture substantially free of said higher boiling constituent into output components by liquefaction and rectification under a lower pressure and then passing one of said output components at said lower pressure through a path in said heat exchange zone and over deposits of precipitate therein as said output component in countercurrent heat exchange relation with the gas mixture, whereby said output component substantially completely evaporates and removes precipitate deposited in said colder portion during the next preceding period before interchange of the paths of the gas mixture and said output component.

4. The method in accordance with claim 3 wherein said mixture of gases is air, said output component is predominantly nitrogen and said higher boiling constituent of the gas mixture is carbon dioxide.

5. The method in accordance with claim 3 wherein said heat-exchange zone has at least two separate parallel paths in heat exchange relation with each other, the compressed gas mixture being passed through one of said paths while the said output component is simultaneously passed through another of said paths.

6. In the method for separating a mixture of gases having different boiling points in the liquid state, comprising passing such a gas mixture in a compressed condition through a path in a heat exchange zone wherein the gas mixture is cooled, passing an output component of said separation under lower temperature and pressure than said compressed gas mixture through another path in said zone in countercurrent heat exchange relation with said gas mixture and periodically interchanging the flow of the gas mixture and said output component in said paths, each of the gas mixture and output component passing through the zone always in the same direction as the initial flow thereof irrespective through which of said paths it is flowing so that, by reason of the countercurrent relationship between the gas mixture and output component, each said interchange reverses the direction of fluid flow in each of said paths; the improvement which comprises separating said gas mixture into two parts prior to its complete passage through said zone, removing the first of said parts directly from said zone, continuing the passage of the second part through said zone, cooling said second part to a temperature sufficient to substantially completely precipitate and deposit a higher boiling constituent of the gas mixture in a colder portion of said zone, further cooling the precipitate-free second part below said precipitation temperature, removing the further cooled said second part from the heat exchange zone, commingling both of said parts of the gas mixture, whereby the first part is cooled sufficiently by said further cooled second part to at least said precipitation temperature to precipitate substantially completely therefrom the said higher boiling constituent, removing the precipitate from the commingled parts of said gas mixture, separating the gas mixture substantially free of said higher boiling constituent into output components by liquefaction and rectification under a lower pressure and then passing one of said output components at said lower pressure through a path in said heat exchange zone and over deposits of precipitate therein as said output component in countercurrent heat exchange relation with the gas mixture, whereby said output component substantially completely evaporates and removes precipitate deposited in said colder portion during the next preceding period before interchange of the paths of the gas mixture and said output component.

7. In the method of separating a mixture of gases having different boiling points in the liquid state, comprising passing such a gas mixture in a compressed condition through a path in a heat exchange zone wherein the gas mixture is cooled, passing an output component of said separation under lower temperature and pressure than said compressed gas mixture through another path in said zone in countercurrent heat exchange relation with said gas mixture and periodically interchanging the flow of the gas mixture and said output component in said paths, each of the gas mixture and output component passing through the zone always in the same direction as the initial flow irrespective through which of said paths it is flowing so that by reason of the countercurrent relationship between the gas mixture and output component, each said interchange reverses the direction of fluid flow in each of said paths; the improvement which comprises separating said gas mixture into two parts prior to its complete passage through said zone, removing the first of said parts directly from said zone, continuing the passage of the second part through said zone, further cooling the gas mixture in said second part to a temperature sufficient to substantially completely precipitate and deposit a higher boiling constituent of the gas mixture in a colder portion of said zone, removing the further cooled said second part from the heat exchange zone, commingling both of said parts of the gas mixture, whereby the first part is cooled sufficiently by said further cooled second part to at least said precipitation temperature to precipitate substantially completely therefrom the said higher boiling constituent, removing the precipitate from the commingled parts of said gas mixture at substantially said precipitation temperature, separating the gas mixture substantially free of said higher boiling constituent into output components by liquefaction and rectification under a lower pressure and then passing one of said output components at said lower pressure through a path in said heat exchange zone and over deposits of precipitate therein as said output component in countercurrent heat exchange relation with the gas mixture, whereby said output component substantially completely evaporates and removes precipitate deposited in said colder portion during the next preceding period before interchange of the paths of the gas mixture and said output component.

8. In the method for separating a mixture of gases having different boiling points in the liquid state, comprising passing such a gas mixture in a compressed condition through a path in a heat exchange zone wherein the gas mixture is cooled, passing an output component of said separation under lower temperature and pressure than said compressed gas mixture through another path in said zone in countercurrent heat exchange relation with said gas mixture and periodically interchanging the flow of the gas mixture and said output component in said paths, each of the gas mixture and output component passing through the zone always in the same direction as the initial flow irrespective through which of said paths it is flowing so that, by reason of the countercurrent relationship between the gas mixture and output component, each said interchange reverses the direction of fluid flow in each of said paths; the improvement which comprises separating said gas mixture into two parts prior to its complete passage through said zone, removing the first of said parts directly from said zone, continuing the passage of the second part through said zone, further cooling the gas mixture in said second part to a temperature sufficient to substantially completely precipitate and deposit a higher boiling constituent of the gas mixture in a colder portion of said zone, removing the further cooled said second part from the heat exchange zone, commingling both of said parts of the gas mixture, whereby the first part is cooled sufficiently by said further cooled second part to at least said precipitation temperature to precipitate substantially completely therefrom the said higher boiling constituent, filtering the precipitate from the commingled parts of said gas mixture at substantially said precipitation temperature, separating the gas mixture substantially free of said higher boiling constituent into output components by liquefaction and rectification under a lower pressure and then passing one of said output components at said lower pressure through a path in said heat exchange zone and over deposits of precipitate therein as said output component in countercurrent heat exchange relation with the gas mixture, whereby said output component substantially completely evaporates and removes precipitate deposited in said colder portion during the next preceding period before interchange of the paths of the gas mixture and said output component.

9. In the method for separating a mixture of gases having different boiling points in their liquid state comprising passing a stream of such a gas mixture in a compressed condition through a path in a heat exchange zone wherein the gas mixture is cooled, passing a gaseous stream of output component of said gas mixture under lower temperature and pressure than said first stream through another path in said zone in countercurrent heat exchange relation with said first stream and periodically interchanging the flow of the two streams between said paths, the flow of the respective streams being always in the same direction as their initial flow through said zone so that by reason of the countercurrent relationship between the two streams each said interchange reverses the direction of fluid flow in each of said paths; the improvement which comprises separating said first stream into two unequal parts prior to its complete passage through said zone, removing the smaller of said parts directly from said zone, continuing the passage of the larger of said parts through said zone, regulating the respective flows of said larger part and said stream of output products through said zone so that the temperature within a colder portion thereof is controlled to effect substantially complete precipitation and deposition of a condensible constituent from said larger part of said first stream and the temperature difference between said larger part of the first stream leaving and said second stream entering the colder portion of said zone is within the range of about 5–10° F., removing said larger part of the first mentioned stream from said heat exchange zone, commingling both said smaller and larger parts of said first stream whereby the smaller of said parts is cooled sufficiently by the larger part to effect substantially completely therefrom the precipitation of said condensible constituent, removing the precipitate from the commingled parts of said first stream, passing the components of the condensible-free said first stream to a liquefying and rectifying step under lower pressure to separate the gas mixture into output components, effecting said last mentioned separation, removing from said rectifying step a gaseous stream rich in the lowest boiling component of said gas mixture and passing the last mentioned stream at said lower pressure through a path in said heat exchange zone and over precipitated deposits therein as the said second gaseous stream in countercurrent heat exchange relation with said first stream whereby upon each of said interchanges the said second gaseous stream substantially completely evaporates and removes precipitate deposited in said colder portion of said zone during the next preceding period before interchange of paths of said first and second streams through said zone.

10. In the method for separating air, having water vapor and carbon dioxide as impurities, comprising passing the air in a compressed condition through a path in a heat exchange zone wherein the air is cooled, passing the nitrogen-rich output product of the separation under lower temperature and pressure than the air through another path in said zone, effecting a countercurrent heat exchange relation between said output product and compressed air and periodically interchanging the flow of air and output product in said paths, each of the air and output product passing through the zone always in the same direction as the initial flow irrespective through which of said paths it is flowing so that, by reason of the countercurrent relationship between the air and output product each said interchange reverses the direction of fluid flow in each of said paths; the improvement which comprises passing the compressed air continuously through a first stage of said zone, cooling the air to a temperature sufficient to effect substantially the complete precipitation and deposition of the water vapor, withdrawing the cool and water-free air from said first stage, separating the withdrawn air into two unequal parts, removing the smaller of said parts directly from said zone, passing the larger of said parts through a second stage in said zone, further cooling the air in said second part to a temperature sufficient to substantially completely precipitate and deposit the carbon dioxide impurity in a colder portion of said zone, withdrawing the further cooled said second part from said second stage of the heat exchange zone, commingling the said smaller with said larger part of the air whereby the smaller of said parts is cooled sufficiently by said further cooled larger of said parts to at least said precipitation temperature of carbon dioxide thereby effecting precipitation of the carbon dioxide impurity from the smaller of said parts, removing said last mentioned precipitate from the commingled parts of the air at said carbon dioxide precipitation temperature, separating the substantially impurity-free air into oxygen-rich and nitrogen-rich output products by liquefaction and recitification under a pressure lower than that imposed on said compressed air, recovering said output products of recitification and passing the nitrogen-rich product at said lower pressure through a path in said heat exchange zone and over deposits of precipitate therein as the said nitrogen-rich output product of the separation effecting countercurrent heat exchange relation with the compressed air whereby the nitrogen-rich output product substantially completely evaporates and removes precipitated impurities deposited in said zone during the next preceding period before interchange of the paths of air and said nitrogen-rich output product.

11. In the method for separating a mixture of gases having different boiling points in the liquid state, comprising passing a stream of such a gas mixture in a compressed condition through a path in a heat exchange zone wherein the gas mixture is cooled, passing a stream of output products of said separation under lower temperature than said compressed gas mixture through another path in said zone in countercurrent heat exchange relation with said stream of gas mixture and periodically interchanging the flow of said streams through said paths, of the respective streams passing through said zone always in the same direction; as the initial flow thereof irrespective through which of said paths it is flowing the improvement which comprises separating said stream of gas mixture into two parts prior to its complete passage through said zone, withdrawing the first of said parts directly from said zone, continuing the passage of the second of said parts through said zone, further cooling the gas mixture in said second part to a temperature sufficient to substantially completely precipitate and deposit a high boiling constituent thereof in a colder portion of said zone, withdrawing the further cooled said second part from said zone, commingling both of said parts to cool said first of said parts to said precipitation temperature thereby effecting substantially the complete precipitation of the said higher boiling constituent of the gas mixture from said commingled parts, removing said last mentioned precipitate from the commingled parts of the stream of gas mixture at said precipitation temperature, dividing the precipitate-free stream of gas mixture into two fractional parts, expanding the first of said fractional parts to lower pressure with the performance of external work, subsequently subjecting both of said fractional parts to a common liquefaction and rectification step at said lower pressure to separate the gas mixture into output products, recovering output products from the rectifying separation and passing a stream rich in one of said output products through a path in said heat exchange zone and over deposits of precipitate therein as said second mentioned stream of output products in countercurrent heat exchange relation with the first mentioned stream of compressed gas mixture whereby said stream of output products substantially completely evaporates and removes precipitate deposited in said colder portion during the next preceding period before interchange of the paths of the streams of gas mixture and said output products.

12. The method in accordance with claim 11 wherein the first of the fractional parts divided from the precipitate-free stream of gas mixture is warmed before the expansion thereof with the performance of external work by being subjected to a separate heat exchange relation with at least a portion of the first part separated from the stream of compressed gas mixture prior to the complete passage of said stream through the heat exchange zone, after direct withdrawal of said first separated part from said zone but before subsequent commingling thereof with the cooled and precipitate-free second of said separated parts.

13. The method in accordance with claim 11 wherein said mixture of gases is air, said output products of the separation in counter-current heat exchange relation with said gas mixture is predominantly nitrogen and said higher boiling constituent of the gas mixture is carbon dioxide.

14. The method in accordance with claim 11 wherein the first of the fractional parts divided from the precipitate-free stream of gas mixture is warmed before the expansion thereof with the performance of external work.

15. In the method of treating a mixture of gases, containing a higher boiling component as an impurity, wherein a stream of compressed gas mixture is passed in one direction of flow through a reversing heat exchange zone in heat exchange with relatively cool counterflowing fluid, obtained from the gas mixture in a latter stage of treatment and not greater in mass quantity than the gas mixture, along a path in the heat exchange zone progressively decreasing in temperature from end to end to effect cooling of the gas mixture and resultant precipitation of said higher boiling component in a colder portion of said path, and wherein a second gaseous stream comprising at least a portion of said counterflowing fluid and substantially free of the higher boiling component and at lower temperature than said colder portion is passed subsequently through the same path in the opposite direction of flow after the first stream has ceased flow therein; the step of controlling the temperature of said colder portion of said path by diverting a minor portion of said stream of compressed gas mixture from the heat exchange zone before the stream reaches said colder portion, passing the major portion of compressed gas mixture through said colder portion of the heat exchange zone, further cooling the major portion flowing through the colder portion of the heat exchange zone to a lower temperature level than the temperature level of said colder portion produced by said first-mentioned heat exchange by passing said major portion in heat exchange with counterflowing fluid greater in mass quantity than the gas mixture in the major portion to maintain a difference between the temperature at which said precipitation occurs at any point in said colder portion and the temperature at which said second gaseous stream flows past said point which is less than would exist but for the diversion of said minor portion, removing the further cooled major portion of compressed gas mixture from the heat exchange zone, then recombining the portions of said stream of compressed gas mixture to cool the minor portion and cause precipitation of said higher boiling impurity therefrom.

16. Apparatus for reversing heat exchange between a gas mixture in compressed condition and a less compressed cooling fluid including in combination a reversing heat exchanger comprising at least two fluid paths connected in operative countercurrent heat exchange relation, inflow conduits for relatively warm gas mixture and relatively cold cooling fluid, outflow conduits for cooled gas mixture and warmed cooling fluid, directive conduit means connecting each of the gas mixture inflow conduit and the cooling outflow conduit with the warm ends of both of said paths, directive means connecting each of the gas mixture outflow conduit and the cooling fluid inflow conduit with the cold ends of both of said paths, valve means in each of said directive conduits for controlling flow of the gas mixture and cooling fluid to and through said paths, a fluid mixing means, means for separating and removing a portion of the gas mixture from either of said paths at a point intermediate the ends thereof, conduit means connecting between the last-mentioned means and the fluid mixing means, and means connecting between the cooled gas mixture outflow conduit and the fluid mixing means whereby partially cooled gas mixture is conducted from an intermediate point of one of said paths and recombined with colder gas mixture in the fluid mixing means.

References Cited in the file of this patent

UNITED STATES PATENTS

| | | |
|---|---|---|
| 2,460,859 | Trumpler | Feb. 8, 1949 |
| 2,579,498 | Jenny | Dec. 25, 1951 |